United States Patent
Lammers

(10) Patent No.: US 6,213,053 B1
(45) Date of Patent: Apr. 10, 2001

(54) BALE FEEDER

(76) Inventor: Eugene A. Lammers, W12534 Liner Rd., Brandon, WI (US) 53919

( * ) Notice: Subject to any disclaimer, the term of this patent is extended or adjusted under 35 U.S.C. 154(b) by 0 days.

(21) Appl. No.: 09/001,061

(22) Filed: Dec. 30, 1997

Related U.S. Application Data

(60) Provisional application No. 60/033,978, filed on Dec. 31, 1996.

(51) Int. Cl.$^7$ ................................. A01K 1/10; A01K 5/00
(52) U.S. Cl. .......................................... 119/51.01; 119/60
(58) Field of Search .................................. 119/51.01, 58, 119/60; 296/57.1

(56) References Cited

U.S. PATENT DOCUMENTS

| | | | |
|---|---|---|---|
| 390,259 | 10/1888 | Schwartz | 119/60 |
| 2,936,735 | 5/1960 | Smith | 119/60 |
| 3,782,333 | 1/1974 | Feterl | 119/60 |
| 3,881,449 | * 5/1975 | Burrack et al. | 119/60 |
| 3,906,901 | 9/1975 | Cox | 119/60 |
| 3,949,706 | 4/1976 | Coon, Jr. | 119/60 |
| 3,999,520 | 12/1976 | Feterl | 119/60 |
| 4,067,298 | 1/1978 | Jones et al. | 119/60 |
| 4,078,523 | 3/1978 | Etzler | 119/60 |
| 4,735,454 | * 4/1988 | Bernard | 296/57.1 |
| 5,076,752 | * 12/1991 | Rader | 119/60 |
| 5,092,273 | 3/1992 | Meyer | 119/60 |
| 5,156,432 | * 10/1992 | McCleary | 296/57.1 |
| 5,178,096 | 1/1993 | Lock | 119/60 |
| 5,361,724 | 11/1994 | Kuhns | 119/60 |
| 5,386,800 | 2/1995 | Pirok | 119/60 |
| 5,477,811 | 12/1995 | Nobles et al. | 119/60 |
| 5,496,145 | 3/1996 | Monin | 119/60 |
| 5,586,519 | 12/1996 | Wilkinson | 119/60 |
| 5,595,140 | 1/1997 | Charboneau | 119/60 |
| 5,743,211 | * 4/1998 | Schoessow | 119/60 |

OTHER PUBLICATIONS

Gruett's Pamphlet entitled "Feed–All Wagon" located in Potter, Wisconsin; undated.

H&S Manufacturing Co., Inc. Pamphlet entitled "Feeder Wagons" located in Marshfield, Wisconsin; undated.

H&S Manufacturing Co., Inc. Pamphlet entitled "Steel Sided Bale Throw Racks" located in Marshfield, Wisconsin; undated.

H&S Manufacturing Co., Inc. Pamphlet entitled "7+4 Forage Boxes" located in Marshfield, Wisconsin; undated.

Gehl Pamphlet entitle "Feeder Wagon" located in West Bend, Wisconsin; Form 4578–12/88–20M; dated 1988.

H&S Manufacturing Co., Inc. Pamphlet entitled "7+4 Feeder Box" located in Marshfield, Wisconsin; undated.

* cited by examiner

Primary Examiner—Charles T. Jordan
Assistant Examiner—Elizabeth Shaw
(74) Attorney, Agent, or Firm—Foley & Lardner

(57) ABSTRACT

A feeder adapted to be positioned on a structure having a bed for supporting hay includes a plurality of walls adapted to vertically extend above the bed and including at least one opening through which hay upon the bed may be accessed by livestock. At least a portion of one wall is selectively movable between a first position in which the portion of the wall extends above the bed and a second position in which the portion of the wall extends below the bed. The feeder is preferably adapted to be carried by or built as part of self-driven vehicles and pushed or pulled vehicles, such as trucks and wagons, respectively.

21 Claims, 2 Drawing Sheets

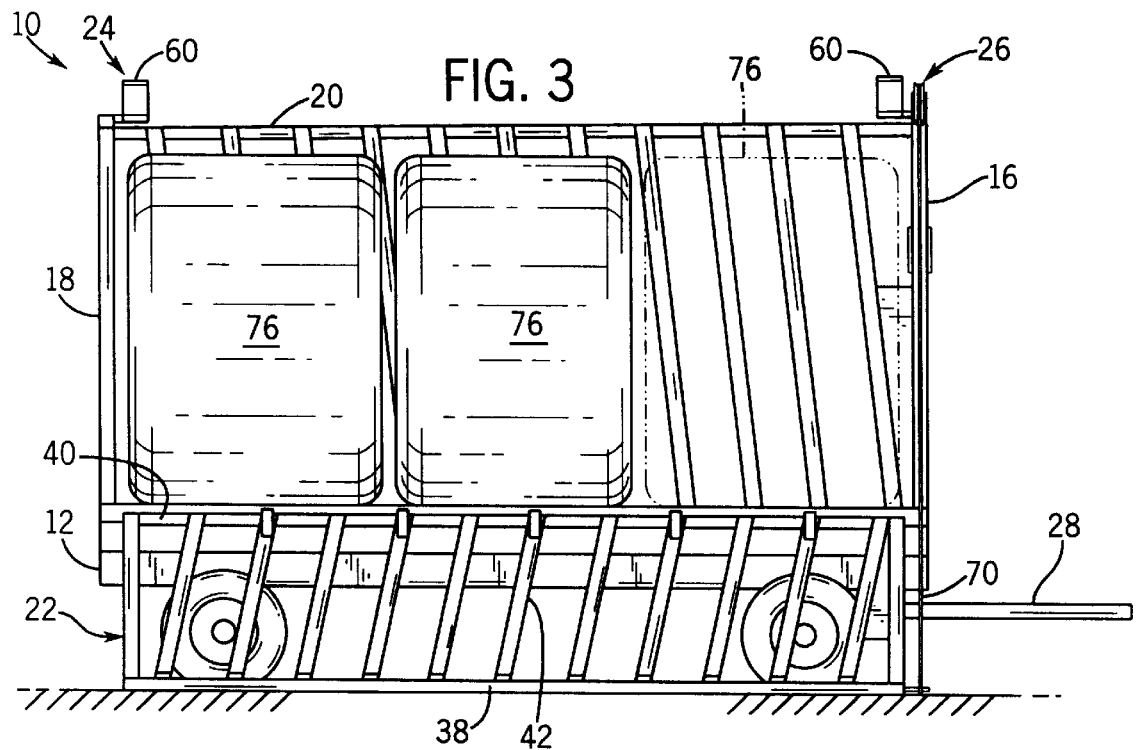
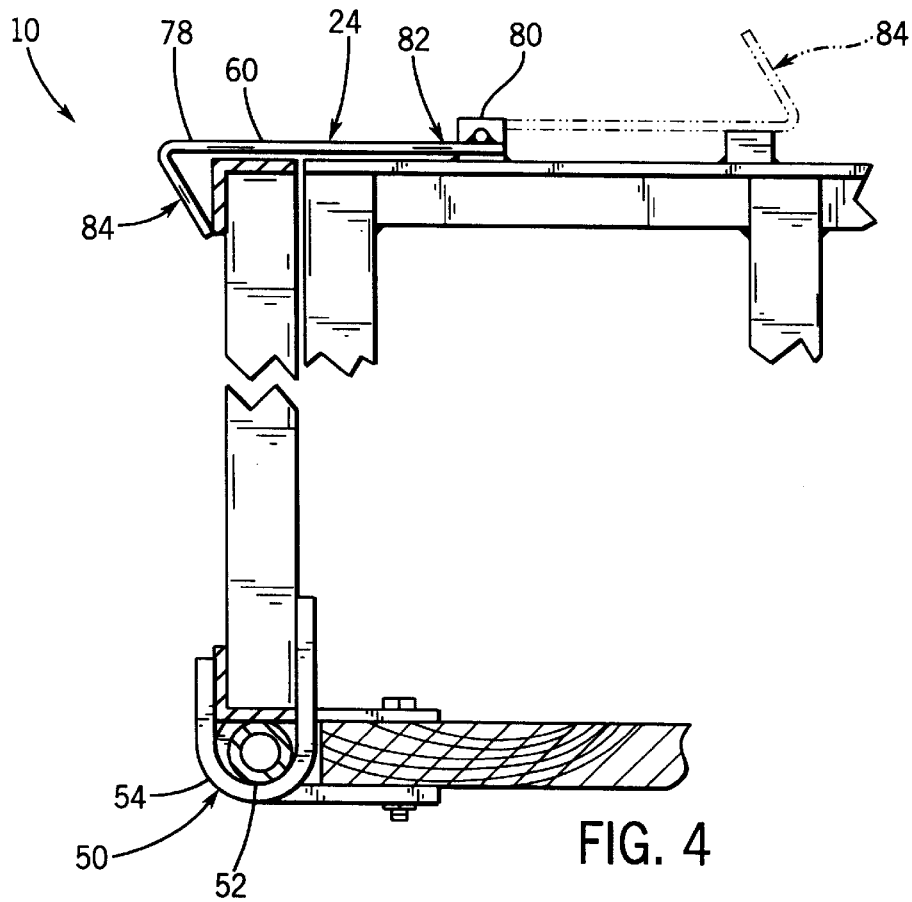

BALE FEEDER

REFERENCE TO COPENDING APPLICATION

This application is a continuation-in-part of provisional U.S. patent application Ser. No. 60/033,978 entitled BALE WAGON and filed on Dec. 31, 1996, and claims priority therefrom under 35 U.S.C. § 119(e).

BACKGROUND OF THE INVENTION

The present invention relates to feeders for transporting and feeding hay to livestock. In particular, the present invention relates to a feeder defining at least one opening through which the hay may be accessed by livestock and at least one movable sidewall which may be raised and lowered for loading hay into the feeder and unloading hay from the feeder. More particularly, the present invention relates to a feeder carried by or built as part of a self-driven vehicles and a pushed or pulled vehicles, such as trucks and wagons, respectively.

Hay, including grass, clover, and alfalfa, is commonly cut and dried for use as forage in feeding livestock such as horses, cattle and sheep. The hay is typically cut and baled in the form of round bales or large stacks. Once baled into either round bales or large stacks, the hay is transported to a storage site or to a feed lot with a wagon. Flat trailer wagons are typically used to transport round bales or large stacks to a storage site. Typical flat trailer wagons include a single bed mounted on a running gear having a tongue for being pulled by a vehicle. Once the flat trailer wagon supporting the bales or stacks has been pulled to the transport site, the bales or stacks are removed for storage. Feeding the bales or stacks typically requires the bales or stacks to be moved and deposited by a lifting device such as a skitter into a stationary bunk wagon.

Although the flat trailer wagons work well for transporting round bales or stacks of hay from the field to a storage site or to a stationary bunk wagon situated for feeding the livestock, flat trailer wagons are not well suited for feeding the round bales or stacks of hay directly to the livestock. Because flat trailer wagons lack sidewalls, livestock feeding from the flat trailer wagon often cause the round bales or stacks of hay to fall off the wagon onto the ground where the hay is often wasted or spoiled. As a result, feeding the hay to the livestock requires a loader or skitter loader for removing the round bales or stacks of hay from the flat trailer wagon and a stationary bunk wagon for containing the round bales or stacks of hay while the hay is being fed to the livestock.

To enable the round bales or stacks of hay to be transported and fed directly from the wagon used to transport the hay, wagons have been developed. Wagons include fixed sidewalls which surround and partially enclose the bed of the wagon. The sidewalls extend vertically from the bed and include multiple openings through which the hay may be accessed by the livestock for feeding. The stationary vertical sidewalls maintain a majority of the hay within the wagon during feeding.

Although wagons including sidewalls enable a single wagon to be used for both transporting hay and feeding the hay, such wagons are extremely difficult and dangerous to load. Because the sidewalls are generally fixed, the hay must be lifted above the sidewalls before being unloaded into the wagon. As a result, the front end loader or skitter loader raising the hay bales is dangerously susceptible to tipping. Moreover, because the hay bale is substantially enclosed and received within the wagon once loaded into the wagon, removing the hay bale from the wagon is difficult, if not impossible. As a result, the hay must be fed out from the wagon before the wagon can be used for transporting additional round bales or stacks of hay.

To enable the hay to be unloaded from the wagons, some wagons include a side wall that pivots about a vertical axis to enable one end of the side wall to be pivoted to an opened position. However, with this wagon, the side walls only enable the hay to be unloaded from the wagon where the feed lot or surrounding area provides sufficient room for completely swinging the side wall to the opened position. In addition, where the wagon is long or where the side wall has great mass, swinging the side wall to the open position may cause the wagon to tip or to become unstable.

SUMMARY OF THE INVENTION

The present invention is directed to a feeder adapted to be positioned on a structure having a bed for supporting hay. The feeder includes a plurality of walls adapted to vertically extend above the bed and including at least one opening through which hay upon the bed may be accessed by livestock. At least a portion of one wall is selectively moveable between a first position in which the portion of the wall extends above the bed and a second position in which the portion of the wall extends below the bed.

In one embodiment of the present invention, the portion of the wall pivots about a non-vertical access between the first position and the second position. The feeder also preferably includes an actuator for moving the portion between the first and second positions. The actuator preferably includes a winch fixedly coupled to the feeder relative to the bed and a cable engaged by the winch and connected to the portion. The feeder includes a retainer for retaining the portion in the first position.

In yet another embodiment, the feeder is built as part of a feeder wagon. The wagon includes a running gear, a bed mounted on the running gear for supporting hay and a plurality of walls vertically extending above the bed and including at least one opening through which hay upon the bed may be accessed by livestock. At least a portion of one wall is selectively moveable between a first position in which the wall extends above the bed and a second position in which the portion extends above the bed and a second position in which the portion extends below the bed. Preferably, the portion pivots about a non-vertical axis so as to pivot between the first and second positions.

BRIEF DESCRIPTION OF THE DRAWINGS

FIG. 3 is a side elevational view of the bale wagon with the sidewall in the lowered position and with the wagon containing round bales.

FIG. 4 is a sectional view of the wagon of FIG. 1 taken along lines 4—4.

DETAILED DESCRIPTION OF THE PREFERRED EMBODIMENTS

Figure 1:
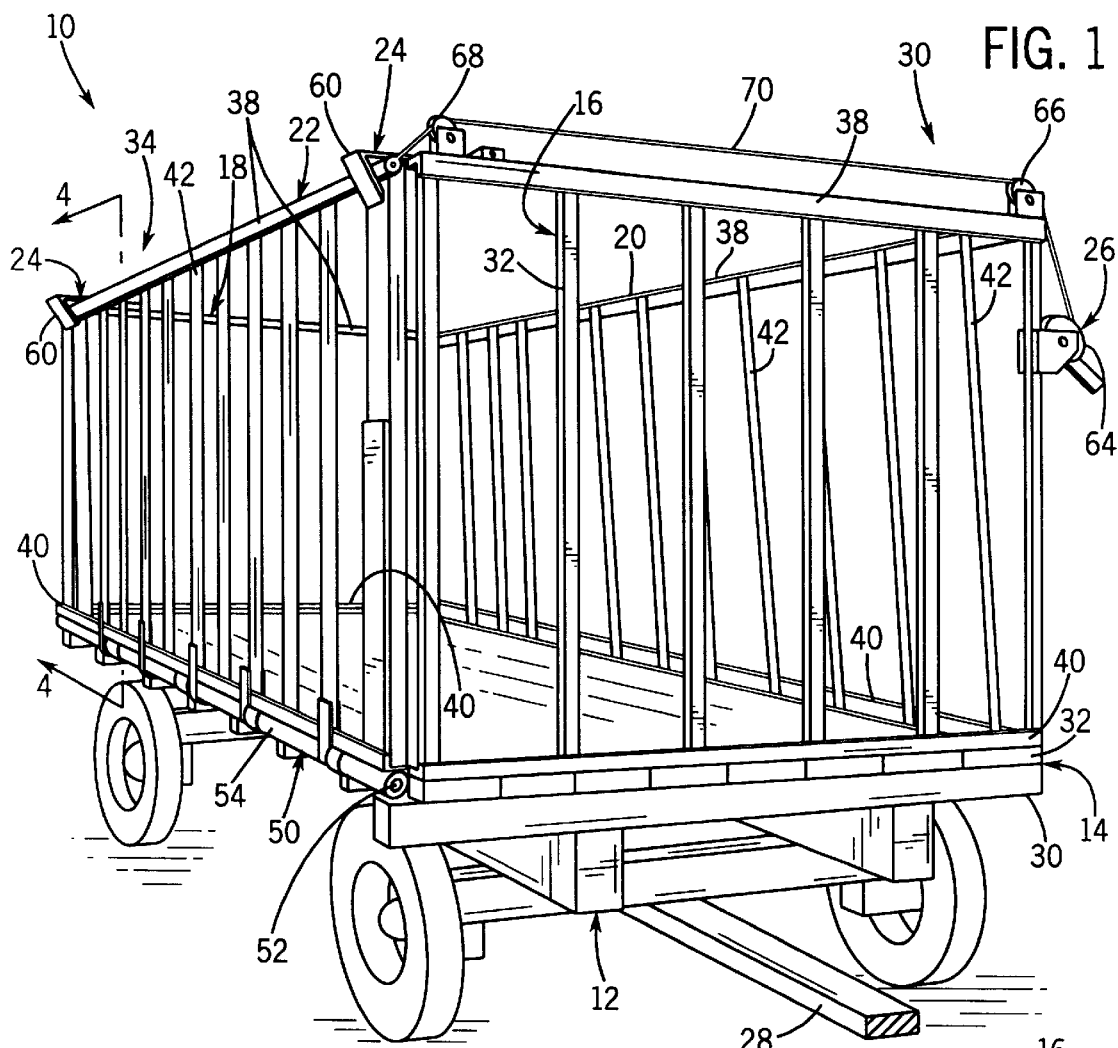
FIG. 1 is a perspective view of a bale wagon of the present invention with a sidewall and a raised position.

FIG. 1 is a perspective view illustrating wagon 10. Wagon 10 generally includes running gear 12, bed 14, front wall 16, rear wall 18, sidewalls 20, 22, sidewall retainer 24 and sidewall actuator 26. Running gear 12 is conventionally known and used in wagons of various types. As conventionally known, running gear 12 includes a wagon tongue 28 pivotally extending from a forward end of running gear 12 towards a front end 30 of wagon 10. Tongue 28 has a forward end (not shown) specifically configured for connection with a vehicle such as a tractor, truck or skitter to enable wagon 10 to be pulled by the vehicle. As can be appreciated, running gear 12 may have various sizes and configurations depending upon the overall size and configuration of wagon 10.

Bed 14 is a generally flat horizontal panel forming a floor surface and supported by running gear 12. In the preferred embodiment illustrated, bed 14 comprises a plurality of transverse support slats 30 fixedly coupled to running gear 12 for supporting longitudinal planks or boards 32. Bed 14 is configured for supporting round bales or stacks of hay. Although bed 14 is illustrated as being a generally flat platform formed from a plurality of longitudinal planks, bed 14 may alternatively be formed from a single solid horizontal sheet of material. Bed 14 may also alternatively be formed from a plurality of spaced apart slats. In addition, bed 14 may alternatively be formed or supported in a non-horizontal fashion. For example, bed 14 may alternatively be slanted towards a particular side of wagon 10. Bed 14 may also have sides or ends which are raised relative to the center so as to form a V-shaped or U-shaped bed to wagon 10.

Front wall 16, rear wall 18, and sidewalls 20 and 22 are coupled to bed 14 and extend vertically upward from bed 14 for maintaining round bales and stacks of hay on bed 14 during transport and during feeding of the hay from wagon 10. Front wall 16 extends generally transverse to the longitudinal direction of wagon 10 between sidewalls 20 and 22 at a front end 30 of wagon 10. Rear wall 18 extends transverse to the longitudinal direction of wagon 10 between sidewalls 20 and 22 opposite front wall 16 near a rear end 34 of wagon 10. Sidewall 20 extends parallel to the longitudinal axis of wagon 10 between front wall 16 and rear wall 18 adjacent one side of wagon 10. Sidewall 22 extends generally parallel to the longitudinal axis of wagon 10 between front wall 16 and rear wall 18 opposite sidewall 20.

Front wall 16, rear wall 18, side and sidewalls 20, 22 each include a top rail 38, a bottom rail 40 and a plurality of vertical bars 42 extending there between. Vertical bars 42 define the height of walls 16, 18, 20 and 22. Vertical bars 42 are sufficiently spaced apart from one another to provide openings through which hay supported upon bed 14 may be accessed by livestock. Bars 42 are preferably spaced apart from one another so as to enable livestock to extend their heads between vertical bars 42 to access hay on bed 14. To prevent the livestock from pulling loose hay out of wagon 10, vertical bars 42 are preferably mounted between top rail 38 and bottom rail 40 at an angle.

In the preferred embodiment illustrated, wagon 10 has a length of 196 inches, a width of 76 inches and a height above bed 14 of 60 inches. The top and bottom rails 38 and 40 comprise two inch angle iron. The vertical bars 42 comprise two inch square 1/8 inch thick tubing. The width between vertical bars 42 is approximately 16 inches. The height of each vertical bar 42 is approximately 60 inches. The angle of the slant to bars 42 is approximately 82 degrees.

Although front wall 16, rear wall 18, and sidewall 20 and sidewall 22 are each illustrated as having openings between vertical bars 42 for enabling livestock to access hay from wagon 10, it is only absolutely necessary that one wall define an opening sufficiently sized for enabling livestock to engage hay upon bed 14. As can be appreciated, front wall 16, rear wall 18, sidewall 20 and sidewall 22 may have any one of a variety of different sizes, shapes and configurations sufficient for containing hay upon bed 14. For example, each of walls 16, 18, 20, 22 may be curved, slanted or contiguous (except for the opening through which livestock access hay upon bed 14).

Figure 2:
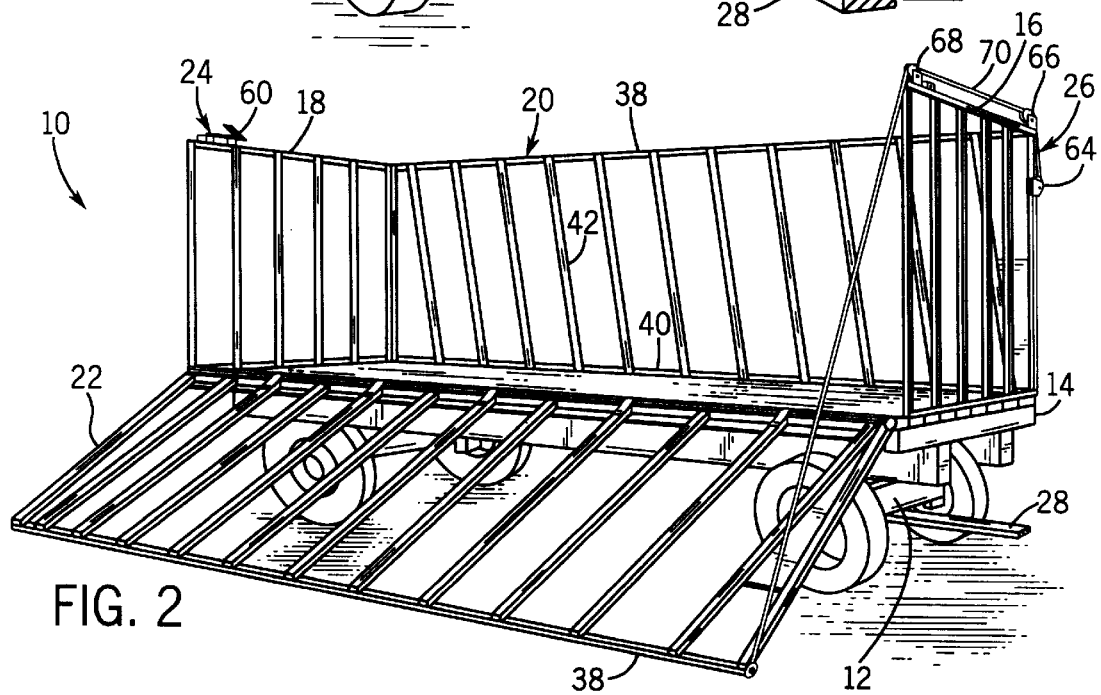
FIG. 2 is a perspective view of the bale wagon with the side wall in the lowered position.

As shown by FIGS. 103, sidewall 22 is pivotally coupled to bed 30 so as to pivot between a first raised position (shown in FIG. 1) and a second lowered position (shown in FIGS. 2 and 3). In the raised position, sidewall 22 cooperates with front wall 16, rear wall 18 and sidewall 20 to form a substantially enclosed area above bed 14 for containing round bales and stacks of hay or other forage. As a result, the round bales or stacks of hay do not fall off of bed 30 or wagon 10 while wagon 10 is being pulled by a vehicle. Moreover, front wall 16, rear wall 18, and sidewalls 20, 22 also prevent the round bales or stacks of hay from being pulled off of bed 30 onto the ground by livestock feeding from wagon 10.

In the lowered position, sidewall 22 pivots so as to extend from bed 14 to a position below bed 14. As a result, round bales and stacks of hay may be easily loaded onto bed 14 of wagon 10 without having to raise the round bales and stacks of hay over and above either the sidewalls or end walls of wagon 10. In contrast, loading a round bale or stack of hay onto bed 14 merely requires lifting the round bale or stack of hay at or above the vertical height of bed 14. Because the round bale or stack of hay needs to be only lifted to the height of bed 14, the loader or skitter loader lifting and loading the hay onto bed 14 is less susceptible to tipping. Consequently, wagon 10 is simpler and safer to load.

In addition to being easier to load, wagon 10 is also easier to unload. Because sidewall 22 pivots so as to extend from bed 14 to the below bed 14, bales and stacks of hay do not need to be lifted for unloading. In contrast, the round bales or stacks of hay upon bed 14 may be easily accessed by the forks, spears or other engaging extensions of a loader or skitter loader. Alternatively, the round bale or stack of hay may be simply pulled or pushed off of bed 12 and out of wagon 10. Because sidewall 22 extends from bed 14 to below bed 14, sidewall 22 also acts as a ramp for allowing gravity to assist in removing the round bales or stacks of hay from bed 14 of wagon 10. Although only sidewall 22 is illustrated as being pivotable between the raised position and lowered position, sidewall 20 may also be pivotable between a raised position and a lowered position. Such an arrangement would enable round bales or stacks of hay to be loaded or unloaded from either side of wagon 10.

In the preferred embodiment illustrated, sidewall 22 is pivotally coupled to bed 14 by hinge 50. Hinge 50 generally comprises support shaft 52 and the tube or sleeve 54. Support shaft 52 is a generally elongate cylindrical rod fixedly coupled to wagon 10 adjacent bed 14. Support shaft 52 is fixedly coupled to a lower end of sidewall 22, preferably by welding. Preferably, shaft 52 is positioned relative to bed 14 so that the lower most end of sidewall 22 pivots to a height level with or slightly below an upper surface of bed 14 to enable easier unloading of bales or stacks from bed 14. Shaft 52 pivotally supports sidewall 22 relative to bed 14. Shaft 14 is preferably fixedly coupled to wagon 14 adjacent rear end 34 of wagon 10. Alternatively, shaft 52 may be fixedly coupled to bed 14 adjacent both front end 34 and rear end 34 of wagon 10.

Sleeve 54 slidably receives shaft 52 so as to rotate about shaft 52. In the preferred embodiment illustrated, sleeve 54 includes zerks (not shown), as are conventionally known, for supplying the interior of sleeve 54 with a lubricant such as grease to better enable sleeve 54 and sidewall 22 to pivot about the axis of shaft 52. Although hinge 50 is illustrated as comprising a sleeve receiving a fixed shaft for pivotally supporting sidewall 22 relative to bed 14, hinge 50 may alternatively comprise any one of a variety of well-known, conventional hinge structures and mechanisms that enables sidewall 22 to pivot relative to bed 14 of wagon 10. Furthermore, although hinge 50 is illustrated as pivotally supporting sidewall 22, relative to bed 14, sidewall 22 may also be pivotally supported adjacent running gear 12 or other structural components of bed 14 so as to enable sidewall 22 to pivot between a first raised position in which sidewall 22 extends above bed 14 and a second position in which sidewall 22 extends below bed 14.

Retainer 24 comprises a pair of latches 60 supported by front wall 16 and rear wall 18, respectively. Latches 60 are each specifically configured for selectively engaging sidewall 22 so as to retain sidewall 22 in the raised position shown in FIG. 1. As shown by FIG. 2, latches 60 may be selectively actuated so as to disengage sidewall 22 to enable sidewall 22 to be moved to the second lowered position. Retainer 24 provides an additional safety measure for preventing sidewall 22 from accidentally falling into the lowered position. Although retainer 24 is illustrated as including a latch adjacent both forward end 30 and rear end 34 of wagon 10, retainer 24 may alternatively comprise a single latch adjacent either forward end 30 or rear end 34 of wagon 10. In addition, retainer 24 may alternatively comprise any one of a variety of any well-known latching mechanisms for retaining and securing sidewall 22 in the raised position. For example, retainer 24 may alternatively comprise a bore or detent in conjunction with a detent-engaging member such as a pin. In such an alternative arrangement, the pin engages a detent to secure sidewall 22 in the first raised position. Numerous other well-known latches and retainers may be utilized to secure sidewall 22 in the raised position. Furthermore, hydraulics and other actuation mechanisms may be additionally provided for moving retainer 24 between the engaged position and the disengaged position.

Actuator 26 is coupled between sidewall 22 and bed 14 for moving sidewall 22 between the raised and lowered positions. In the preferred embodiment illustrated, actuator 26 comprises a conventional winch and cable system including winch 64, pulley wheels 66, 68 and cable 70. Winch 64 is a standard winch fixedly mounted to a corner of wagon 10 between front wall 30 and sidewall 20 below top rails 38 of front wall 16 and sidewall 20. Winch 64 preferably includes a locking mechanism for locking sidewall 22 at a selected position along and between the raised and lowered positions. Pulley wheel 66 is rotatably coupled to front wall 16 adjacent sidewall 20 of wagon 10. Pulley wheel 66 guides movement of cable 70. Pulley wheel 68 is rotatably coupled to front wall 16 adjacent sidewall 22 of wagon 10. Pulley wheel 68 also guides cable 70. Cable 70 extends from winch 64 across pulley wheels 66 and 68 into connecting engagement with top rail 38 of sidewall 22. As a result, rotation of winch 64 releases an additional length of cable 70 to lower sidewall 22. Opposite rotation of winch 64 takes up lengths of cable 70 to raise sidewall 22. In lieu of the winch and cable system illustrated, actuator 26 make comprise any one of a variety of well-known mechanisms for raising and lowering structures such as a chain hoist, hydraulics, springs and power takeoff belt driven actuators.

FIGS. 2 and 3 illustrate sidewall 22 in the lowered position. FIG. 2 is a perspective view of wagon 10 with sidewall 22 in the lowered position. FIG. 3 is a side elevational view of wagon 10 containing two round bales 76 of hay. The third round bale of hay is shown in phantom. To lower sidewall 22, latches 60 of retainer 24 are each released and disengaged from sidewall 22. Winch 64 is then unlocked and rotated so as to unwind cable 70 from winch 64 such that sidewall 22 pivots about hinge 50 with the assistance of gravity. As shown by FIGS. 2 and 3, sidewall 22 is preferably pivoted so that top rail 38 of sidewall 22 rests upon the ground during unloading of bale 76 from bed 14 of wagon 10. In the lowered position shown in FIG. 2, round bales or stacks of hay may be easily loaded upon bed 14 through the open side between front wall 16 and rear wall 18 of wagon 10. The bales or stacks of hay may be lifted to a height just above bed 14 and unloaded onto bed 14 or may alternatively be pushed up the ramp formed by sidewall 22 onto bed 14. Because the entire longitudinal length of bed 14 of wagon 10 may be easily accessed, bales or stacks of hay may be precisely positioned upon bed 14 to maximize the loading capacity of wagon 10.

In the lowered position shown in FIG. 3, sidewall 22 forms a ramp enabling bale 76 upon bed 14 to be easily unloaded from wagon 10 by either pushing or pulling bale 76 off of bed 14 down the ramp. In addition, bale 76 may alternatively be unloaded by simply raising the spears or other engaging mechanisms of a loader to a height just above bed 14 and moving the spears or the engaging mechanism into engagement with at least one bale 76 to unload bale 76 from wagon 10. Because the entire side of wagon 10 may be lowered by lowering sidewall 22, bales 76 positioned along the entire longitudinal length of wagon 10 may each be easily unloaded by moving bales 76 perpendicular to the longitudinal access of wagon 10.

FIG. 4 is an enlarged fragmentary sectional view of wagon 10 taken along lines 4—4 illustrating latch 60 of retainer 24. In particular, FIG. 4 illustrates latch 60 engaged with sidewall 22. Latch 60 is also shown in phantom, disengaged from sidewall 22. As shown by FIG. 4, latch 60 includes angle bar 78 and a mounting bracket 80. Angle bar 78 is a flat rigid metal bar having a pivot end 82 pivotally coupled to rear wall 18 by bracket 80 and a hook end 84 which extends over top rail 38 of sidewall 22 adjacent an outer side of sidewall 22. In the engaged position, hook end 84 engages sidewall 22 to prevent sidewall 22 from pivoting about shaft 52. In the disengaged position, hook end 84 is pivoted about end 82 away from sidewall 22 so as to enable sidewall 22 to pivot into the lowered position.

Overall, because sidewall 22 is pivotable between a raised position and a lowered position, wagon 10 may be used for both transporting round bales or stacks of hay from the field or from a first storage site to a second storage site or to a location for feeding the round bales or hay to livestock. In the raised position, wall 22 prevents the round bales or stacks of hay from being removed or pulled off of bed 14 so as to enable wagon 10 to be used as a wagon for feeding livestock directly from wagon 10. In the lowered position, sidewall 22 enables the round bales or stacks of hay upon bed 14 to be easily unload for storage or for feeding in a conventional bunk wagon. Because the round bales or stacks of hay within wagon 10 maybe easily unloaded, wagon 10 may be once again used for transporting additional round bales or stacks of hay. Even when used solely as a wagon, wagon 10 is more easily and safely loaded with round bales or stacks of hay as compared to conventional wagons.

A variety of different embodiments are contemplated within the scope of the invention. For example, bed 14 may additionally include a movable web or undercarriage powered by a power takeoff or other actuators for moving bales or stacks of hay either longitudinally along the length of wagon 10 or transversely across the width of wagon 10 to assist in loading or unloading. With such an arrangement, it would not be necessary that an entire longitudinal length of sidewall 22 be movable between the first raised position and the second lowered position to access the entire longitudinal length of wagon 10 for loading and unloading. However, the portion of sidewall 22 must have a length sufficient for enabling an enlarged round bale or stack of hay to be loaded onto bed 14 through the opening formed by the lowered portion of sidewall 22. In such an alternative arrangement, it is also contemplated that rear wall 18 may be pivoted adjacent to bed 14 to enable rear wall 18 to pivot between the first raised position and the second lowered position. Once a bale is loaded through the opening formed by lowered rear wall 18, the web along bed 14 would operate to move the round bale or stack of hay towards front end 16 to enable additional bales to be further loaded at the rear end of wagon 10. Similarly, bales positioned along the longitudinal length of wagon 10 could be carried by the web toward rear end 34 for unloading through the opening formed by lower rear wall 18.

Moreover, it is also contemplated that front wall 16, rear wall 18, side walls 20, 22, side wall retainer 24 and side wall actuator 26 could be constructed as a single interconnected feeder unit adapted for being carried by a self-propelled vehicle, such as in a truck bed, or carried by a pulled or pushed vehicle, such as a standard wagon or flat bed trailer. In such contemplated embodiments, the feeder would be releasably secured to the vehicle by chains, brackets or other well-known attachment devices. In such contemplated embodiments, wall 18, 20 and 22 could be coupled to one another wherein at least a portion of one of the walls is configured so as to be moveable between a first position in which the portion extends above the bed and a second position in which the portion extends below the bed. In such contemplated embodiments, the feeder itself may additionally include a bed coupled to the walls and providing a floor surface or the feeder may have an open bottom so as to utilize the existing bed and floor surface of the vehicle.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A wagon comprising:

a running gear;

a bed mounted upon the running gear for supporting hay; and a plurality of walls vertically extending above the bed and including at least one opening through which hay upon the bed may be accessed by livestock, wherein at least one wall is selectively movable between a first position in which the wall extends above the bed and a second position in which the wall extends below the bed, wherein said at least one wall comprises a sidewall extending along a longitudinal length of the wagon; wherein the bed has first and second opposite sides and a centerline intermediate the first and second opposite sides and wherein the at least one wall extends below the bed and away from the first and second sides and the centerline in a horizontal direction in the second position.

2. The wagon of claim 1 wherein said at least one wall pivots about a non-vertical axis so as to pivot between the first and second positions.

3. The wagon of claim 1 including:

an actuator for moving a sidewall between the first and second positions.

4. The wagon of claim 3 wherein the actuator includes:

a winch fixedly coupled to the wagon relative to the bed; and a cable engaged by the winch and connected to said at least one wall.

5. The wagon of claim 1 including:

a retainer for retaining said at least one wall in the first position.

6. The wagon of claim 5 wherein the retainer includes:

a latch coupled to the wagon so as to move between a first engaged position and a second disengaged position, wherein the latch retains said at least one wall in the first position in the engaged position.

7. A wagon comprising:

a running gear;

a bed mounted upon the running gear for supporting hay; and a plurality of walls vertically extending above the bed and including at least one opening through which hay upon the bed may be accessed by livestock wherein at least a portion of one wall has a first end and a second opposite end and a plurality of rigid spaced bars extending from the first end to the second end, wherein the first end is pivotably coupled to the bed such that the portion of the wall pivots about a non-vertical axis so as to pivot between a first position in which the second end of the portion of the wall extends above the bed and a second position in which the second end of the portion of the wall extends below the bed and rests upon the ground, wherein the portion extends along a longitudinal length of the wagon.

8. The wagon of claim 7, including an actuator for moving the portion between the first and second positions.

9. The wagon of claim 8, wherein the actuator includes:

a winch fixedly coupled to the wagon relative to the bed; and a cable engaged by the winch and connected to the portion.

10. The wagon of claim 7, including a retainer for retaining the portion in the first position.

11. The wagon of claim 10, wherein the retainer includes:

a latch coupled to the wagon so as to move between the first engaged position and the second disengaged position, wherein the latch retains the portion in the first position in the engaged position.

12. The wagon of claim 7 wherein the bed has first and second opposite sides and wherein the at least one wall extends below the bed and away from the first and second sides in the second position.

13. A feeder adapted to be positioned on a structure having a floor surface for supporting hay, the feeder comprising:

a plurality of walls adapted to vertically extend above the floor surface and including at least one opening through which hay upon the floor surface may be accessed by livestock, wherein at least a portion of one wall extends along a longitudinal length of the feeder and is selectively moveable between a first position in which the portion of the wall extends above the floor surface and a second position in which the portion of the wall extends below the floor surface;

wherein the floor surface has first and second opposite sides and a centerline intermediate the first and second opposite sides and wherein the at least a portion of one wall extends below the floor surface and away from the first and second sides and the centerline in a horizontal direction in the second position.

14. The feeder of claim 13, wherein said at least a portion of one wall pivots about a non-vertical axis between the first position and the second position.

15. The feeder of claim 13, including an actuator for moving the portion between the first and second positions.

16. The feeder of claim 13, wherein the actuator includes:

a winch fixedly coupled to the feeder relative to the floor surface; and a cable engaged by the winch and connected to the portion.

17. The feeder of claim 13, including a retainer for retaining the portion in the first position.

18. The feeder of claim 13, including:

the plurality of wheels rotatably coupled to the floor surface.

19. A wagon comprising:

a running gear;

a bed mounted upon the running gear for supporting hay;

a plurality of walls vertically extending above the bed and including at least one opening through which hay upon the bed may be accessed by livestock, wherein at least one wall is selectively movable between a first position in which the wall extends above the bed and a second position in which a wall extends below the bed; and an actuator for moving a sidewall between the first and second positions.

20. A wagon comprising:

a running gear;

a bed mounted upon the running gear for supporting hay;

a plurality of walls vertically extending above the bed and including at least one opening through which hay upon the bed may be accessed by livestock wherein at least a portion of one wall pivots about a non-vertical axis so as to pivot between the first position in which the portion of the wall extends above the bed and a second position in which the portion of the wall extends below the bed; and an actuator for moving the portion between the first and second positions.

21. A feeder adapted to be positioned on a structure having a floor surface for supporting hay, the feeder comprising:

a plurality of walls adapted to vertically extend above the floor surface and including at least one opening through which hay upon the floor surface may be accessed by livestock, wherein at least a portion of one wall is selectively moveable between a first position in which the portion of the wall extends above the floor surface and a second position in which the portion of the wall extends below the floor surface; and an actuator for moving the portion between the first and second positions.

* * * * *